United States Patent
Hoffman

(10) Patent No.: US 7,584,643 B2
(45) Date of Patent: Sep. 8, 2009

(54) METHOD FOR TESTING THE FUNCTIONALITY OF AN ACTUATOR, ESPECIALLY OF AN ACTUATOR OF A SAFETY VALVE

(75) Inventor: Heinfried Hoffman, Frankfurt am Main (DE)

(73) Assignee: Samson AG, Frankfurt am Main (DE)

( * ) Notice: Subject to any disclaimer, the term of this patent is extended or adjusted under 35 U.S.C. 154(b) by 344 days.

(21) Appl. No.: 11/340,314

(22) Filed: Jan. 26, 2006

(65) Prior Publication Data

US 2006/0185418 A1 Aug. 24, 2006

(30) Foreign Application Priority Data

Jan. 31, 2005 (DE) .................... 10 2005 004 477

(51) Int. Cl.
*G01L 27/00* (2006.01)
(52) U.S. Cl. ....................................... 73/1.72
(58) Field of Classification Search ............... 73/1.71, 73/1.72; 251/90–93, 284, 89
See application file for complete search history.

(56) References Cited

U.S. PATENT DOCUMENTS

| | | | |
|---|---|---|---|
| 4,274,438 | A | 6/1981 | La Coste |
| 4,896,101 | A | 1/1990 | Cobb |
| 5,197,328 | A | 3/1993 | Fitgerald |
| 6,276,385 | B1 | 8/2001 | Gassman |
| 6,678,584 | B2 | 1/2004 | Junk et al. |
| 6,751,544 | B2 | 6/2004 | Hashimoto et al. |
| 6,935,610 | B1 * | 8/2005 | DeBruyne ................ 251/93 |
| 2003/0183194 | A1 | 10/2003 | Noguchi |
| 2005/0098960 | A1 | 5/2005 | Hoffman et al. |
| 2006/0119466 | A1 | 6/2006 | Flentge et al. |
| 2006/0162783 | A1 | 7/2006 | Valentin-Rumpel |
| 2006/0191314 | A1 | 8/2006 | Karte |
| 2006/0266966 | A1 | 11/2006 | Karte et al. |

FOREIGN PATENT DOCUMENTS

| | | |
|---|---|---|
| DE | 10318171 | 10/1997 |
| DE | 19615176 A1 | 10/1997 |
| DE | 19921828 | 11/2000 |
| DE | 19723650 B9 | 10/2001 |
| DE | 10209545 | 10/2003 |

* cited by examiner

*Primary Examiner*—Hezron Williams
*Assistant Examiner*—Tamiko D Bellamy
(74) *Attorney, Agent, or Firm*—Woodling, Krost and Rust

(57) ABSTRACT

In a method for testing the functionality of an actuator in an actuating system, especially for the actuator of a valve (2) in a safety-oriented circuit in which the partial stroke test method is used, where the actuator is moved briefly by its drive element (8) such as a valve rod over a portion of its actuating path to test its functionality, the goal is to prevent the actuating system from closing too far during the performance of the partial stroke test method. This is accomplished in that, to prevent the actuating system from closing too far, the drive element (8) with the actuator is driven in such a way that it can be moved only within permitted limits during the partial stroke test. The actuating path of the actuator (7, 8) is limited by a mechanical stop (15). The pressure in the drive of the actuator (8) can also be increased continuously until the friction of the system is overcome, where a conclusion concerning the status of the actuating system can be drawn on the basis of the pressure value at which the actuator (8) starts to move.

15 Claims, 4 Drawing Sheets

METHOD FOR TESTING THE FUNCTIONALITY OF AN ACTUATOR, ESPECIALLY OF AN ACTUATOR OF A SAFETY VALVE

The invention pertains to a method according to the introductory clause of claim 1.

In safety-oriented industries, especially in the chemical and in power generation industries, safety valves must be tested regularly to ensure that they are operating properly. Safety valves are used only rarely, because they are intended only for emergencies.

The "partial stroke" test method is a known way of testing the functionality of safety valves. To check the ability of the valve to function properly, the actuator of the valve is briefly moved over a portion of its actuating path.

It is possible in this way to determine, for example, whether a valve is blocked unacceptably, whether a spring of the actuator or of the valve is broken, whether corrosion is present on a valve ball, or whether undesirable crystallization has occurred on the valve.

If the actuator is blocked because of, for example, the presence of a medium adhering to the valve or to the valve body, the so-called "break-loose" effect can occur. When a certain actuating force is exceeded, the valve suddenly breaks loose and moves so abruptly, that, when the partial stroke test method is used, it travels beyond the desired position or beyond the intended partial-stroke position. If the valve closes too far, however, unintended disturbances or even hazardous situations can develop.

DE 197 23 650 B9 describes a method for monitoring the actuator of a valve. A force is generated by an actuating drive, which causes the actuator of the valve to move continuously and uniformly. This movement continues until a correcting variable has been changed in such a way that a resultant force at the output of a position controller acts on a spindle with the effect of reversing the direction of the spindle's movement. So that monitoring can be performed on the basis of the movement of the actuator without the use of additional sensors, it is proposed that time values be determined, namely, the time at which the direction first reverses and the length of time during which the spindle does not move. This time span is then compared with nominal values. The length of time required before the direction reverses is important because it characterizes the friction of a stuffing box. This time value can also be used to detect a broken drive spring. A device for implementing the method comprises a sensor for measuring the position of the valve and a microprocessor unit, which processes the measured times and compares them with nominal values.

DE 197 23 650 B9 does not, however, propose any measures for preventing a valve from closing too far when the partial stroke test method is used.

The invention is based on the task of easily preventing an actuating system or an actuating valve of this type from closing too far when the partial stroke test method is used.

The task is accomplished by a method according to the characterizing features of claim 1 in conjunction with its introductory features.

Advantageous elaborations of the invention are the objects of the subclaims.

Devices which are operated by purely manual means are not suitable for solving the problem, because operating errors can impair the availability of the safety device. The surprising discovery was made that a simple mechanical device can be used to create an automatically operated and automatically monitored method for testing the functionality of safety devices.

By limiting the distance traveled according to the invention, preferably by means of a mechanical stop, the disturbance to a system caused by the overdosing of an actuating system, especially of a safety valve, can be avoided. It is thus possible to exclude the possibility that a hazardous state will develop in the plant during the functionality test.

In a preferred elaboration of the inventive method, the mechanical stop is pushed into the actuating path to prevent the test stroke or the test angle from exceeding a maximum value. In this way, a linear-stroke valve, a ball cock, a flap valve, or the like can be tested without causing the actuator to "break loose" after overcoming an excessive amount of friction.

The invention proposes that the preferably mechanical stop be designed as a movable cam, which engages with the spindle of the actuator. The cam can be easily moved by a pneumatic cylinder or an electromagnetic system. It is therefore easy to retrofit existing actuating systems in this way.

It is advisable for a sensor to transmit the stop position to a control unit. The signal indicating the corresponding position of the actuating element can be processed in the control unit.

Another advantageous elaboration of the invention is characterized in that the pressure in the drive for the actuator is increased continuously until the friction of the system is overcome. A conclusion concerning the status of the actuating system can then be drawn on the basis of the pressure value at which the actuator starts to move. The gradual, preferably ramp-like increase in pressure prevents the actuator from moving too abruptly, and it also provides the opportunity to determine the coefficient of friction. This value makes it possible in turn to determine whether or not a malfunction is present as the result of adhering medium, a broken spring, or some other defect.

It is advantageous to increase the pressure continuously up to a value beyond a certain nominal value or a value typical of the system under optimum operating conditions.

To avoid causing problems with the system, it is advantageous to reduce the pressure as soon as an error message is received.

So that tolerated changes in the actuating system, e.g., changes which can develop over prolonged periods of time, can be taken into account automatically, the nominal values can be updated at regular intervals in the system and can be stored, for example, in the form of comparison tables or the like in the memory of a control device.

The invention is now explained in greater detail on the basis of a description of the figures.

Figure 1:
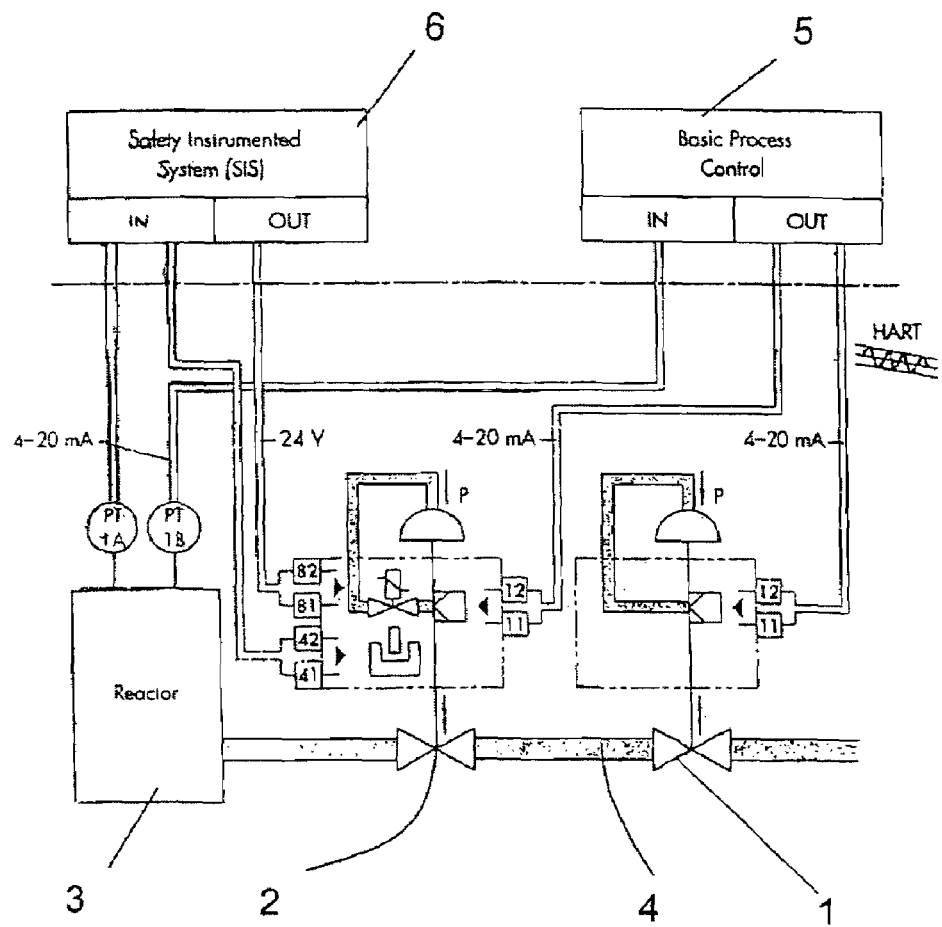
FIG. 1 shows a schematic diagram of a valve arrangement.

FIG. 1 shows a valve arrangement with a main valve 1 and a safety valve 2. These are installed in a pipeline 4 leading to or from a reactor 3. The pipeline carries a fluid stream, the flow of which can be influenced by the valves 1 and 2. The main or actuating valve 1 is controlled by a basic process control 5, as illustrated in FIG. 1. The safety valve 2, however, is controlled by a safety instrumented system 6. The safety valve 2 is part of a safety-oriented circuit and can be used in, for example, a chemical plant or a power plant. It is designed to control fluid flows in particular.

Figure 2:
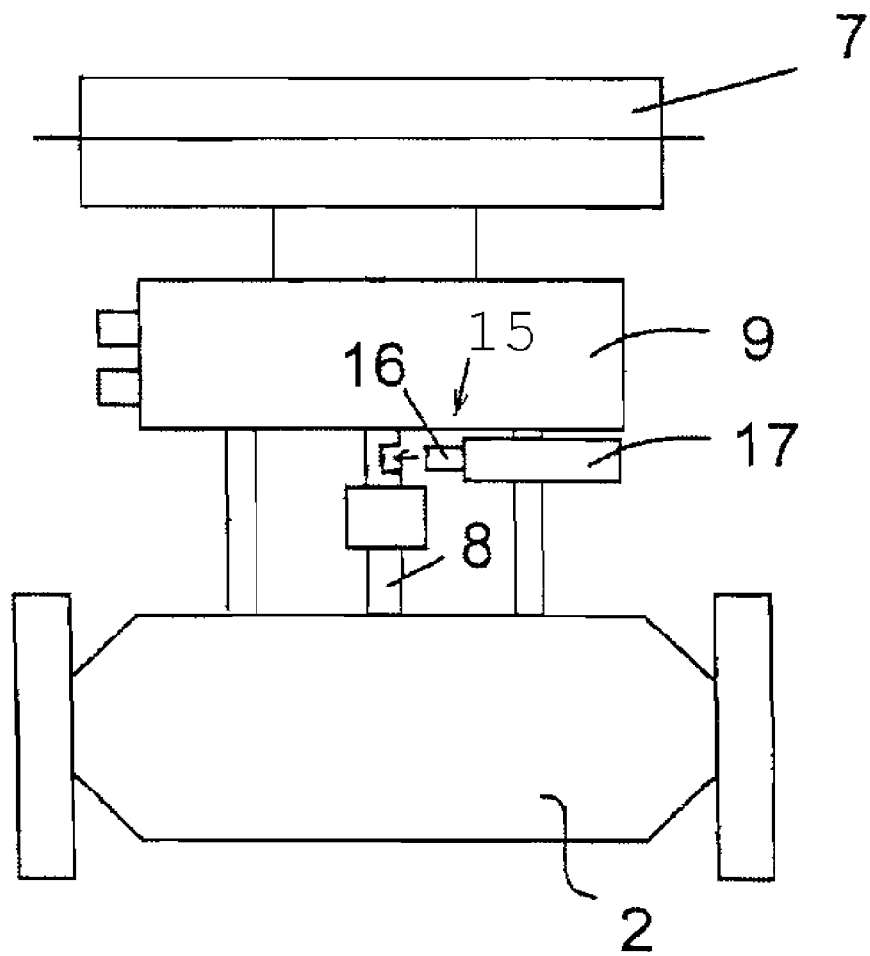
FIG. 2 shows a schematic diagram of a safety valve with a mechanical stop or blocking device.

The safety valve 2 is shown schematically in FIG. 2. It comprises a drive element 8 of an actuator, which opens and closes the valve 2. The drive element 8 is preferably a valve rod, especially a linear-stroke rod. In the case of valves which are adjusted by pivoting or rotational movements, the drive element 8 will be a drive shaft. In addition, an electronic circuit housing 9 is mounted on this compact arrangement. The housing contains the necessary electronic circuits and a diagnostic unit for evaluating the data and/or for controlling the valve 2.

The safety valve is installed in an actuator, which has a pneumatic drive. The actuator comprises a position controller for performing the movement test. This position controller contains a sensor, a control unit, and a pressure transducer, which is connected to the pneumatic drive. The position controller is mounted as an attachment on the drive 7 or can be integrated into the yoke of the drive. Other types of installation such as those corresponding to the NAMUR standards are also possible.

According to the invention, the valve is prevented from closing too far by operating the drive element 8 and thus the actuator in such a way that they can move only within permitted limits during the partial stroke test.

For this purpose a mechanical stop 15 or blocking device is present, which limits the actuating path of the drive element 8 and thus of the actuator. For example, the stop can limit the movement in such a way that the valve 2 remains at least 90% open. The mechanical stop 15 is pushed into the actuating path so that a linear-stroke valve does not exceed a maximum test stroke or so that a ball cock or flap valve does not exceed a maximum test angle.

The mechanical stop 15 is designed as a movable stop element, especially as a movable cam 16, a stud, a pin, or the like, which engages with the spindle of the actuator.

The cam 16 is moved by a pneumatic cylinder 17, as illustrated in FIG. 2. Alternatively, the cam 16 can be moved by an electromagnetic system.

The drive element 8, designed as a spindle, is blocked when the cam 16 projects into the thread of the drive element spindle. A recess, a groove, or some other type of stop surface can also be provided on the drive element 8 to achieve the desired travel limitation.

In addition, the stop position can be transmitted by a sensor to a controller, e.g., to the safety instrumented system 6.

Figure 3:
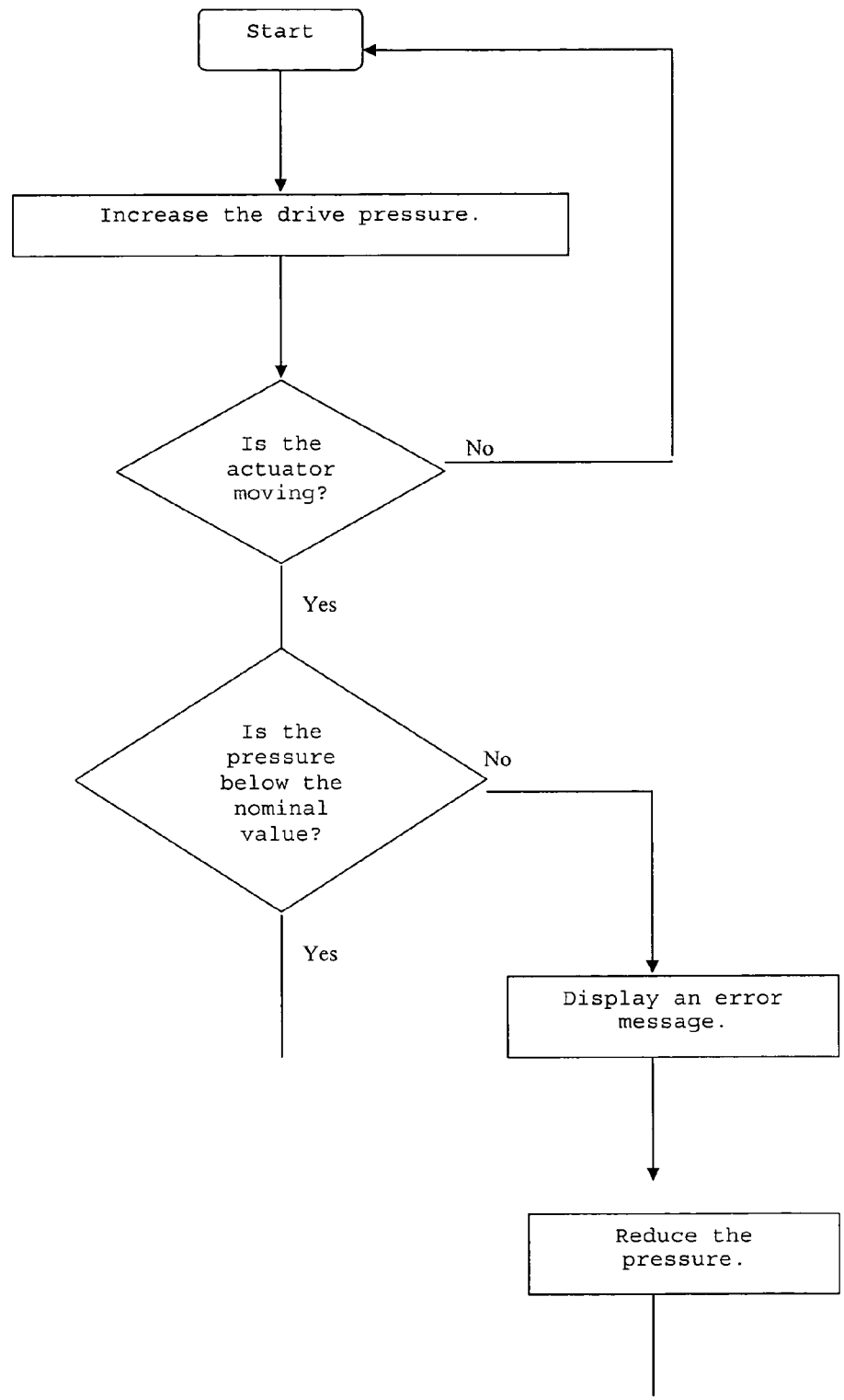
FIG. 3 shows a flow chart of a pressure control sequence.
Figure 4:
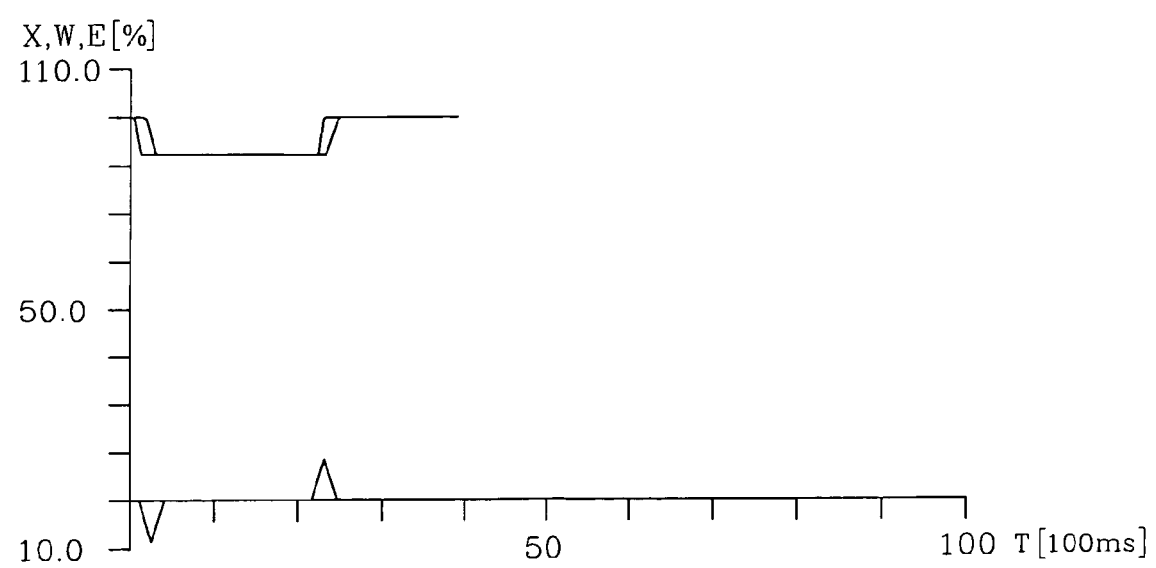
FIG. 4 shows a diagram of the actuating movement of an actuating valve as a function of time according to the partial-stroke test method.

In addition or as an alternative to the use of the mechanical stop, the pressure in the drive of the actuator can be increased continuously until the friction of the system is overcome, as illustrated in FIG. 3. The pressure value at which the actuating element starts to move makes it possible to draw conclusions concerning the status of the actuating system.

If, for example, a medium is present in the valve which impairs the valve's functionality or if the valve is blocked for some other reason, the actuating element will not move, even though sufficient actuating force is being applied to it. In this case, that is, if it is determined that the valve is malfunctioning, the drive pressure is reduced.

The drive pressure is preferably increased in a ramp-like manner. Alternatively, the pressure can be increased in stages.

It can be advantageous to define a maximum value for the change in drive pressure. Respecting this maximum value is intended to prevent the valve from overdosing.

As FIG. 3 illustrates, an error signal is transmitted when the continuously increasing pressure reaches a value which is beyond a certain nominal value. The pressure is reduced as soon as this error message is received.

To determine one or more nominal friction values, the system is tested in the "good" state, that is, in a state of optimum functionality. These values serve as guidelines for the later function test. The nominal values are updated in the system at regular intervals. Testing in the good state also serves to determine a maximum value for the pressure change in the drive 7, which serves to prevent the valve from overdosing.

LIST OF REFERENCE NUMBERS

1 main valve
2 safety valve
3 reactor
4 pipeline
5 basic process control
6 safety instrumented system
7 drive
8 drive element
9 electronic housing
15 stop
16 cam
17 cylinder

The invention claimed is:

1. Method for testing the functionality of a valve actuator movable along an actuated path in an actuating system in a safety-oriented circuit in which the partial stroke test method is used, a drive for driving a valve rod drive element (8) which includes a spindle, said valve rod drive element movable over a portion of its actuating path to test functionality, comprising the steps of:

driving said actuator within permitted limits to prevent the actuating system from closing too far;

limiting said actuating path of said valve rod drive element (8) with a mechanical stop (15), said mechanical stop includes a movable cam (16) which engages said spindle of said valve rod drive element (8), said cam (16) is moved by a pneumatic cylinder (17); and, pushing said mechanical stop (15) and said cam (16) into said actuating path of said valve rod drive element (8) so that a maximum test stroke or a maximum test angle is not exceeded.

2. Method according to claim 1 wherein said valve rod drive element 8 is driven by said drive, further comprising the steps of:

increasing pressure, continuously, in said drive for moving said valve rod drive element (8) of the actuator until friction is overcome;

evaluating the status of said valve actuator on the basis of the pressure value at which said valve rod drive element (8) of the actuator starts to move.

3. Method according to claim 2, wherein said pressure is increased in a ramp-like manner.

4. Method according to claim 2 wherein an error signal is transmitted when said continuously increasing pressure reaches a value beyond a certain nominal value.

5. Method according to claim 4, wherein said pressure is reduced as soon as an error message is received.

6. Method according to claim 2 wherein actual friction values are determined while the system is functioning optimally and are used to form nominal friction values.

7. Method according to claim 6 wherein nominal values are updated in the system at regular intervals.

8. Method according to 2 wherein a maximum value for the pressure change in the drive for the partial-stroke test method is determined while the drive is functioning optimally.

9. Method for testing the functionality of a valve actuator movable along an actuated path in an actuating system in a safety-oriented circuit in which the partial stroke test method is used, a drive for driving a valve rod drive element (8) which includes a spindle, said valve rod drive element movable over a portion of its actuating path to test functionality, comprising the steps of:

driving said actuator within permitted limits to prevent the actuating system from closing too far;

limiting said actuating path of said valve rod drive element (8) with a mechanical stop (15), said mechanical stop includes a movable cam (16) which engages said spindle of said valve rod drive element (8), said cam (16) is moved by an electromagnetic system; and, pushing said mechanical stop (15) and said cam (16) into said actuating path of said valve rod drive element (8) so that a maximum test stroke or a maximum test angle is not exceeded.

10. Method according to claim 9 wherein said valve rod drive element 8 is driven by said drive, further comprising the steps of:

increasing pressure, continuously, in said drive for moving said valve rod drive element (8) of the actuator until friction is overcome;

evaluating the status of said valve actuator on the basis of the pressure value at which said valve rod drive element (8) of the actuator starts to move.

11. Method according to claim 10, wherein said pressure is increased in a ramp-like manner.

12. Method according to claim 10, wherein an error signal is transmitted when the continuously increasing pressure reaches a value beyond a certain nominal value.

13. Method according to claim 12, wherein the pressure is reduced as soon as an error message is received.

14. Method according to claim 10, wherein actual friction values are determined while the system is functioning optimally and are used to form nominal friction values.

15. Method according to claim 10 wherein a maximum value for the pressure change in the drive for the partial-stroke test method is determined while the drive is functioning optimally.

* * * * *

UNITED STATES PATENT AND TRADEMARK OFFICE
CERTIFICATE OF CORRECTION

PATENT NO. : 7,584,643 B2
APPLICATION NO. : 11/340314
DATED : September 8, 2009
INVENTOR(S) : Hoffman Page 1 of 1

It is certified that error appears in the above-identified patent and that said Letters Patent is hereby corrected as shown below:

Col. 2, line 6, after "the" delete "overdosing" and insert --overclosing--.

Col. 3, line 63, after "from" delete "overdosing" and insert --overclosing--.

Signed and Sealed this

Tenth Day of November, 2009

David J. Kappos
*Director of the United States Patent and Trademark Office*